United States Patent [19]
Lindberg

[11] 3,852,108
[45] Dec. 3, 1974

[54] METHOD AND DEVICE FOR RECOVERING GLASS FIBER FROM GLASS FELT REJECTS

[75] Inventor: Martin Lindberg, Karhula, Finland

[73] Assignee: A. Ahlstrom Osakeyhtio, Noormarkku, Finland

[22] Filed: Aug. 20, 1973

[21] Appl. No.: 390,099

[30] Foreign Application Priority Data
Sept. 4, 1972 Finland .............................. 2440/72

[52] U.S. Cl. ........................... 134/2, 34/10, 34/156, 65/65 R, 134/19, 134/37
[51] Int. Cl. ............................................ C03c 23/00
[58] Field of Search ............ 34/156, 10; 65/2, 65 R; 117/46 CA, 46 FA; 134/2, 19, 37

[56] References Cited
UNITED STATES PATENTS

| | | | |
|---|---|---|---|
| 2,500,665 | 3/1950 | Courtright | 117/46 CA |
| 2,845,364 | 7/1958 | Waggoner | 117/146 FA |
| 3,253,897 | 5/1966 | Falls | 134/37 |
| 3,680,218 | 8/1972 | Belue | 34/156 |
| 3,739,491 | 6/1973 | Creapo et al. | 34/156 |

Primary Examiner—Robert L. Lindsay, Jr.
Attorney, Agent, or Firm—Bucknam and Archer

[57] ABSTRACT

A method for recovering glass fibers from glass mat rejects is disclosed, wherein the glass mat reject is brought into a closed chamber the temperature of which is kept below the softening temperature of glass fiber but above the combustion temperature of the binding agent.

3 Claims, 1 Drawing Figure

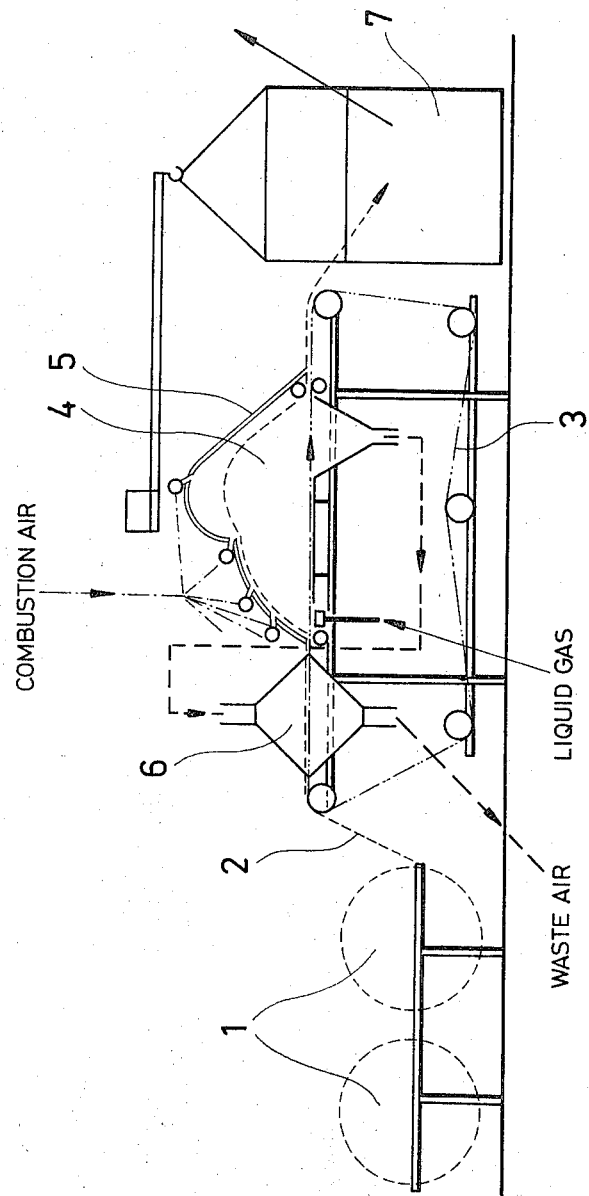

METHOD AND DEVICE FOR RECOVERING GLASS FIBER FROM GLASS FELT REJECTS

BACKGROUND OF THE INVENTION

1. Field of the Invention

The invention relates to a method and device for recovering glass fibers from glass felt rejects.

2. Description of the Prior Art

A great deal of rejects not good for marketing are created in glass felt production. There have been no economically profitable methods for separating the glass fibers from the binding agent present in the glass felt, and therefore glass felt rejects have not been utilized.

The object of the invention is to provide an economically profitable method for recovering and reusing, in glass felt production, the glass fibers present in the rejects created in the production process.

SUMMARY OF THE INVENTION

According to the invention the glass mat reject is now carried through a closed heat treatment zone wherein the temperature is maintained between the softening temperature of the glass fibers and the combustion temperature of the binding agent of the glass mat reject.

DESCRIPTION OF THE DRAWING

The invention is described in more detail with reference to the enclosed drawing, which shows a side view of a preferred device for carrying out the method according to the invention.

DESCRIPTION OF THE PREFERRED EMBODIMENT

In the device illustrated in the drawing, reject rolls 1 of glass felt are brought to the end of the device, where the glass mat 2 is placed on a perforated, endless, fireproof wire 3. The wire 3 conveys the glass mat 2 through the preheating device and further into the combustion furnace 4. Liquid petroleum gas is fed into the furnace 4 from below through the wire 3, and combustion air from both above and below through the wire 3. By means of combustion air and liquid petroleum gas, the furnace is controlled so that a suitable temperature prevails there for burning the binding agent and that the glass mat 2 is suspended in the furnace 4 without touching the furnace mantle 5 or the wire 3. The mantle 5 of the furnace 4 is water-cooled to facilitate temperature control and also to prevent glass fibers from softening and sticking to the mantle 5. The smoke gases from the furnace 4 are fed into the preheater 6, where they are directed further through the glass mat 2. From the furnace 4 the wire 3 conveys the glass fibers to batching scales 7. From there, the glass fibers are taken to a washing device (not shown) where the soot formed from the binding agent at the combustion stage is washed away.

The temperature of the furnace 4 cannot be kept high enough for the soot created from the binding agent to burn away because then the glass fibers would soften too much and would become sintered. The binding agent begins to decompose at about 300°C, and the softening temperature of glass fiber is 845°C. Consequently, the combustion takes place between these two temperatures.

When the output of a device according to the invention is 55 kg/h, the consumption of liquid petroleum gas is about 10 kg/h and that of combustion air about 2,000 m³/min.

What is claimed is:

1. A method for recovering glass fibers from glass mat containing a binding agent dispersed upon glass fibers, which comprises introducing a fuel and air into a combustion zone to maintain a combustive atmosphere therein, preheating the glass mat by conducting exhaust gases from said combustion zone through the mat, conveying the glass mat into said combustion zone, directing the flow of fuel and air into said combustion zone to thereby support the mat in suspension therein, and maintaining the temperature in said combustion zone below the softening temperature of the glass fibers but above the combustion temperature of the binding agent to burn said binding agent away from the glass fibers, and conveying the glass fibers thus separated from the mat out of said combustion zone.

2. The method according to claim 1 wherein the temperature of said combustion zone is maintained between 300° and 800°C.

3. An apparatus for recovering glass fibers from glass mat containing a binding agent dispersed upon glass fibers, which comprises a furnace, an endless screen conveyor disposed for movement through said furnace to convey glass mat into said furnace and to convey glass fibers out of said furnace, means of feeding fuel gas and air into said furnace from above and below the glass mat and through said screen conveyor to establish a combustive atmosphere in the furnace for burning the binding agent away from the glass fibers of the glass mat and to support the glass mat suspended within the furnace without touching the screen conveyor or the boundary surfaces of the furnace, and means disposed to pass exhaust gases from the furnace through glass mat entering the furnace to preheat said glass mat.

* * * * *